United States Patent
Nagai et al.

(10) Patent No.: US 6,374,798 B1
(45) Date of Patent: Apr. 23, 2002

(54) FUEL INJECTION CONTROLLER FOR CYLINDER INJECTION ENGINE

(75) Inventors: Tadayuki Nagai, Toyota; Senji Kato, Aichi-ken; Zenichiro Mashiki, Nisshin, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/657,136

(22) Filed: Sep. 7, 2000

(30) Foreign Application Priority Data

Sep. 9, 1999 (JP) .......................................... 11-256173

(51) Int. Cl.⁷ ............................................... F02B 17/00
(52) U.S. Cl. ...................................... 123/295; 123/491
(58) Field of Search ................................. 123/295, 305, 123/491

(56) References Cited

U.S. PATENT DOCUMENTS

| | | | | |
|---|---|---|---|---|
| 5,785,031 A | * | 7/1998 | Akimoto et al. ............ | 123/305 |
| 5,878,711 A | * | 3/1999 | Kamura et al. ............. | 123/305 |
| 5,970,950 A | * | 10/1999 | Shimizu et al. ............ | 123/295 |
| 5,988,136 A | * | 11/1999 | Piock et al. ............... | 123/295 |
| 6,044,642 A | * | 4/2000 | Nishimura et al. ......... | 123/295 |
| 6,050,232 A | * | 4/2000 | Grob et al. ................ | 123/295 |
| 6,062,191 A | * | 5/2000 | Ooba ........................ | 123/295 |
| 6,125,816 A | * | 10/2000 | Inoue ........................ | 123/295 |
| 6,240,896 B1 | * | 6/2001 | Ueda et al. ................ | 123/295 |

FOREIGN PATENT DOCUMENTS

| | | |
|---|---|---|
| JP | 4-187841 | 7/1992 |
| JP | 10-030468 | 2/1998 |

\* cited by examiner

*Primary Examiner*—John Kwon
(74) *Attorney, Agent, or Firm*—Kenyon & Kenyon (57) ABSTRACT

A fuel injection controller of a cylinder injection engine selects an injection mode from various fuel injection modes including an intake stroke injection mode, in which fuel is injected during an intake stroke, and a compression stroke injection mode, in which fuel is injected during a compression stroke. The controller includes a selector for selecting the compression stroke injection mode when the engine is cool if the temperature of the engine when the engine is started is within a predetermined temperature range and for selecting the intake stroke injection mode when the engine is cool if the temperature of the engine when the engine is started is higher than the predetermined temperature range.

20 Claims, 4 Drawing Sheets

FUEL INJECTION CONTROLLER FOR CYLINDER INJECTION ENGINE

BACKGROUND OF THE INVENTION

The present invention relates to a fuel injection controller, and more particularly, to a fuel injection controller for a cylinder injection engine that injects fuel directly into a combustion chamber.

Japanese Unexamined Patent Publication No. 10-30468 describes a controller for a cylinder injection engine, which injects fuel directly into a combustion chamber. The controller controls fuel injection in accordance with the operating state of the engine and selectively injects fuel in the intake stroke (intake stroke injection mode) and the compression stroke (compression stroke injection mode). In a typical cylinder injection engine, if compression stroke injection is performed when the temperature of the combustion chamber is low, the time provided for vaporizing the fuel is short. Thus, the fuel is not vaporized as desired. This affects combustion and increases the amount of unburned gases in the emissions. To prevent such emissions when the engine is started and the engine coolant temperature is relatively low, the time for vaporizing the injected fuel is lengthened by injecting fuel during the intake stroke. When the engine is started and the coolant temperature is relatively high, fuel is injected during the compression stroke. This improves fuel efficiency and the exhaust gas emissions. However, in the cylinder injection engine, due to the different fuel injection timing, the manner in which fuel deposits in the combustion chamber when the engine is cool differs between the intake stroke injection mode and the compression stroke injection mode.

However, in the conventional cylinder injection engine, intake stroke injection and compression stroke injection are controlled without taking into consideration the deposition of the fuel on the surfaces of the combustion chamber when the engine is cool. This hinders combustion thereby producing undesirable exhaust gas emissions and lower performance.

SUMMARY OF THE INVENTION

It is an object of the present invention to provide a if fuel injection controller for a cylinder injection engine having improved exhaust gas emissions and drivability when the engine is cool.

To achieve the above object, the present invention provides a fuel injection controller of a cylinder injection engine that selects an injection mode from various fuel injection modes including an intake stroke injection mode, in which fuel is injected during an intake stroke, and a compression stroke injection mode, in which fuel is injected during a compression stroke. The controller includes a selection means for selecting the compression stroke injection mode when the engine is cool if the temperature of the engine when the engine is started is within a predetermined temperature range and for selecting the intake stroke injection mode when the engine is cool if the temperature of the engine when the engine is started is higher than the predetermined temperature range.

A further aspect of the present invention provides a method for controlling fuel injection in a cylinder injection engine that selects an injection mode from various fuel injection modes including an intake stroke injection mode, in which fuel is injected during an intake stroke, and a compression stroke injection mode, in which fuel is injected during a compression stroke. The method includes selecting the compression stroke injection mode when the engine is cool if the temperature of the engine when the engine is started is within a predetermined temperature range, and selecting the intake stroke injection mode when the engine is cool if the temperature of the engine when the engine is started is higher than the predetermined temperature range.

Other aspects and advantages of the present invention will become apparent from the following description, taken in conjunction with the accompanying drawings, illustrating is by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
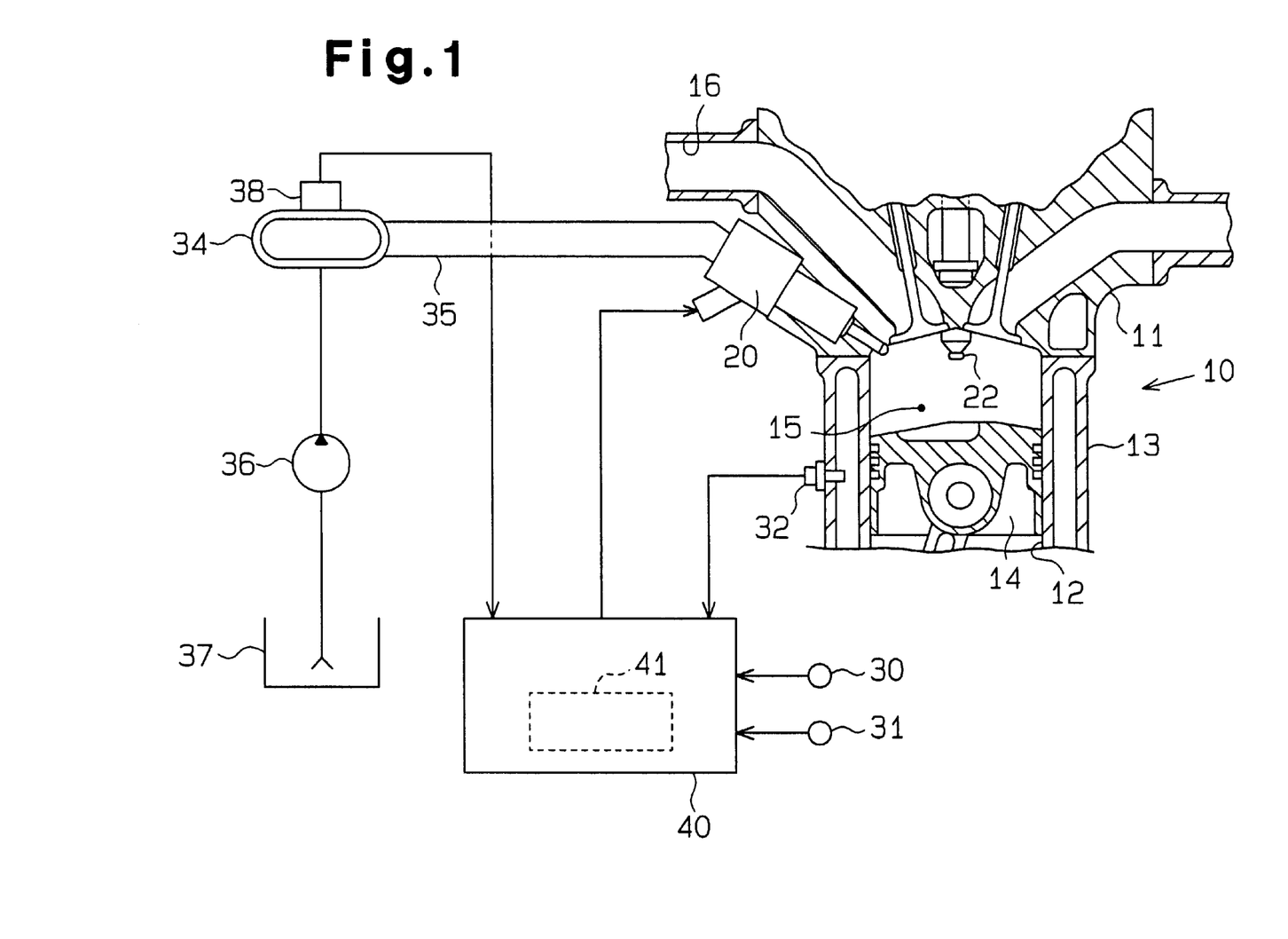
FIG. 1 is a schematic diagram showing an engine incorporating a fuel injection controller according to a first embodiment of the present invention.

FIG. 1 is a schematic view showing an engine 10 incorporating an electronic control unit (ECU 40) functioning as a fuel injection controller according to a first embodiment of the present invention.

The engine 10 includes a cylinder head 11 and a cylinder block 13, which has a plurality of cylinders 12 (only one shown in FIG. 1). Each cylinder 12 accommodates a reciprocal piston 14. The piston 14, the wall of the cylinder 12, and the cylinder head 11 define a combustion chamber 15. Intake air is supplied to the combustion chamber 15 via an intake passage 16. An intake air temperature sensor (not shown) is arranged in the intake passage 16 to detect the temperature of the intake air.

A fuel injection valve 20, which injects fuel directly into the combustion chamber 15, and a spark plug 22, which ignites the air fuel mixture in the combustion chamber 15, are provided for each cylinder 12 on the cylinder head 11. The fuel injection valve 20 is connected to a delivery pipe 34 via a supply passage 35. Fuel is supplied to the fuel injection valve 20 from the delivery pipe 34. Fuel is supplied from a fuel tank 37 to the delivery pipe 34 by a fuel pump 36. A fuel pressure sensor 38 is arranged in the delivery pipe 34 to detect the fuel pressure in the delivery pipe 34.

The engine 10 is provided with sensors used to detect the operating state of the engine 10, such as a crank angle sensor 30, a cam angle sensor 31, and a coolant temperature sensor 32. The crank angle sensor 30 and the cam angle sensor 31 are arranged near a crankshaft and a cam shaft (neither shown) to detect the rotating speed (engine speed) and rotational phase (crank angle CA) of the crankshaft. The coolant temperature sensor 32 is arranged in the cylinder block 13 to detect the temperature of the engine coolant (coolant temperature THW).

The ECU 40 receives detection signals from various sensors including the sensors 30–32, 38. In accordance with the detection signals, the ECU 40 drives each of the fuel injection valves 20 to perform fuel injection control and a predetermined ignition control. The ECU 40 functions as a selecting means and a compensating means. Further, the ECU 40 includes a memory 41, which stores programs for controlling fuel injection and ignition, computation maps, and data obtained when performing the controls.

In accordance with the operating state of the engine 10, the ECU 40 changes the fuel injection mode between an intake stroke injection mode, in which fuel is injected during the intake stroke, and a compression stroke injection mode, in which fuel is injected during the compression stroke.

When the engine 10 is being started (cranked), the ECU 40 sets the fuel injection mode to the intake stroke injection mode and controls the fuel injection valves 20 so that fuel is injected during the intake stroke. By injecting fuel during the intake stroke when the engine 10 is started, sufficient time exists for vaporizing the fuel injected into the combustion chambers 15. This stabilizes ignition and combustion and guarantees that the engine 10 will start.

After the engine 10 is started, if the engine temperature of the engine 10 during starting, or the engine coolant temperature when starting the engine 10 (hereafter referred to as the starting time coolant temperature THWST), is within a predetermined temperature range, the ECU 40 sets the injection mode to the compression stroke. The ECU 40 sets the injection mode to the intake stroke injection mode when the engine temperature is not within the predetermined temperature range.

Figure 4:
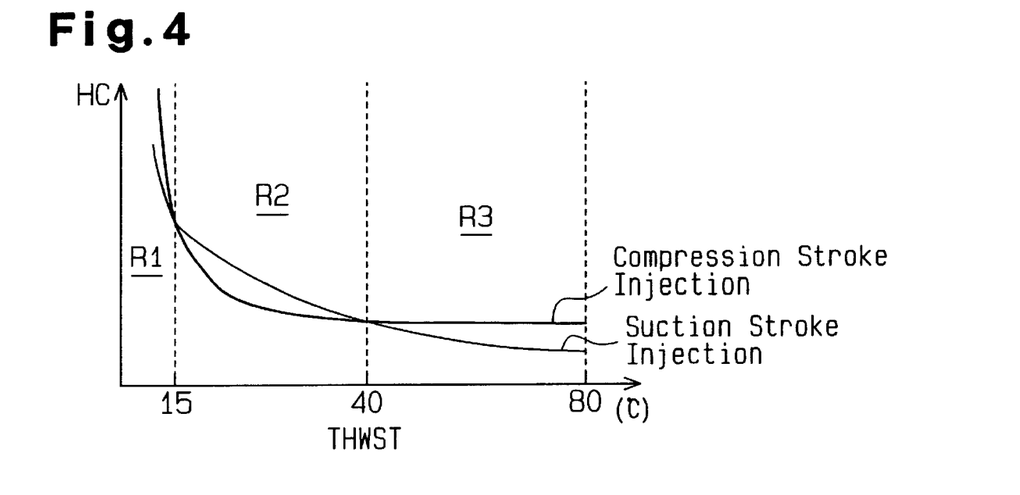
FIG. 4 is a graph showing the relationship between the temperature of the engine coolant and the emitted amount of unburned gases when the engine is started.

With reference to FIG. 4, the starting time coolant temperature may have three ranges, for example, a first temperature range R1, in which the temperature is lower than 15° C., a second temperature range R2, in which the temperature is from 15° C. to 40° C., and a third temperature range R3, in which the temperature is between 40° C. and a temperature indicating that the engine 10 has been started (e.g., 80° C.). When the starting time coolant temperature THWST is in the second temperature range R2, the ECU 40 switches the injection mode from the injection stroke injection mode to the compression stroke injection mode. When the starting time coolant temperature THWST is in the first or third temperature ranges R1, R3, the ECU 40 maintains the injection mode in the intake stroke injection mode.

When the vaporization of the injection fuel is satisfactory, the amount of injected fuel deposited on the tops of the pistons 14 and the walls of the cylinders 12 including the walls of the combustion chambers 15 is small. In this state, the amount of unburned gases in the emissions decreases. Thus, the injection mode is switched to the compression stroke injection mode when the engine starting time coolant temperature THWST is in the relatively high second temperature range R2.

When the engine starting time coolant temperature THWST is in the third temperature range R3, the amount of fuel deposited on the walls of the combustion chambers 15 is substantially null regardless of whether the injection mode is in the intake stroke injection mode or the compression stroke injection mode. In this embodiment, however, the injection mode is maintained in the intake stroke injection mode when the starting time coolant temperature THWST is in the third temperature range R3. This is because, although the amount of unburned gases in the emissions is small during the compression stroke injection mode, the amount of unvaporized injected fuel, or the amount of unburned gases in the emissions, is more in comparison to that of the intake stroke injection mode.

A fuel injection control procedure performed when the engine 10 is cool after being started will now be discussed.

Figure 2:
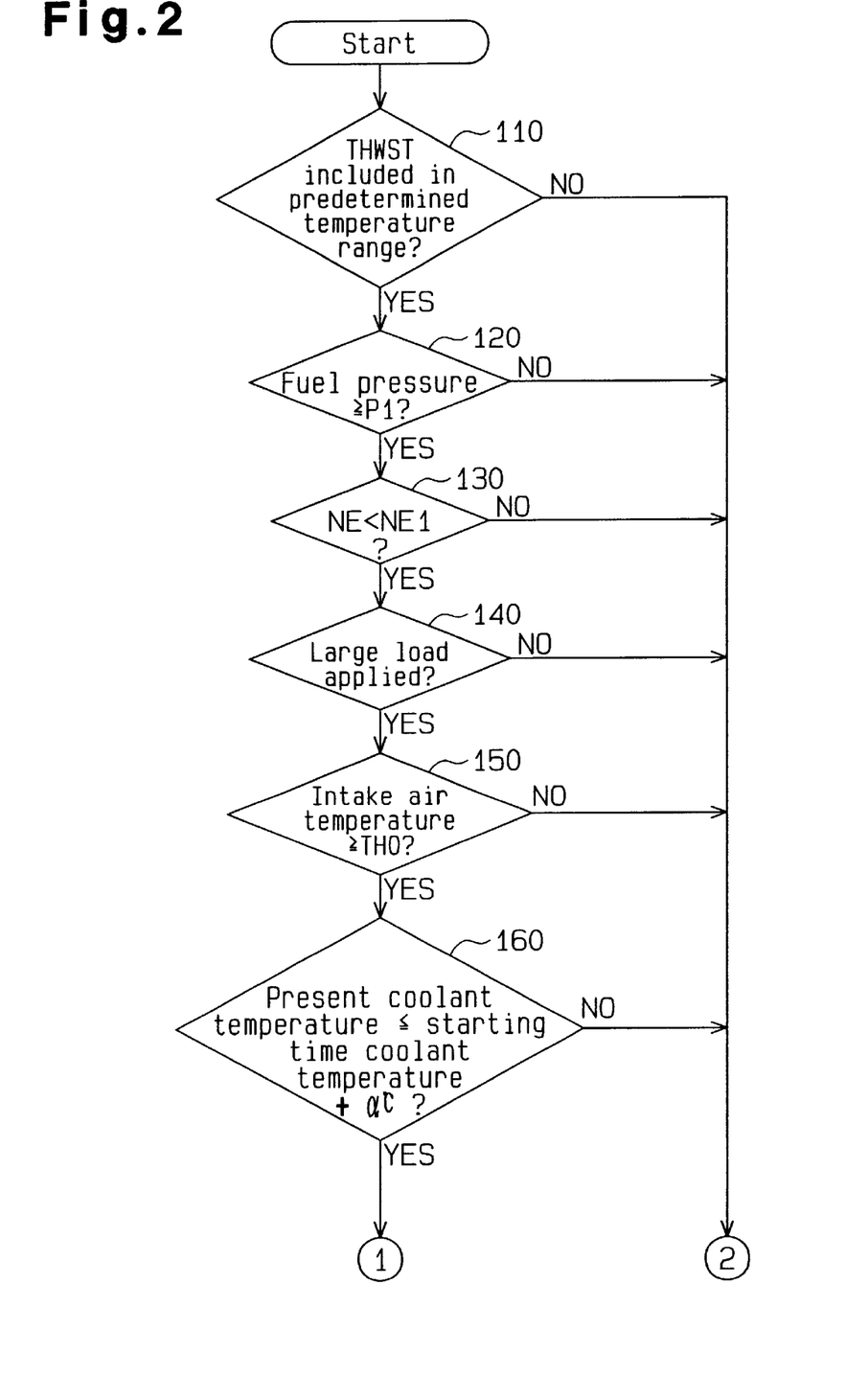
FIG. 2 is a flowchart showing a routine for controlling fuel injection when the engine is cool.
Figure 3:
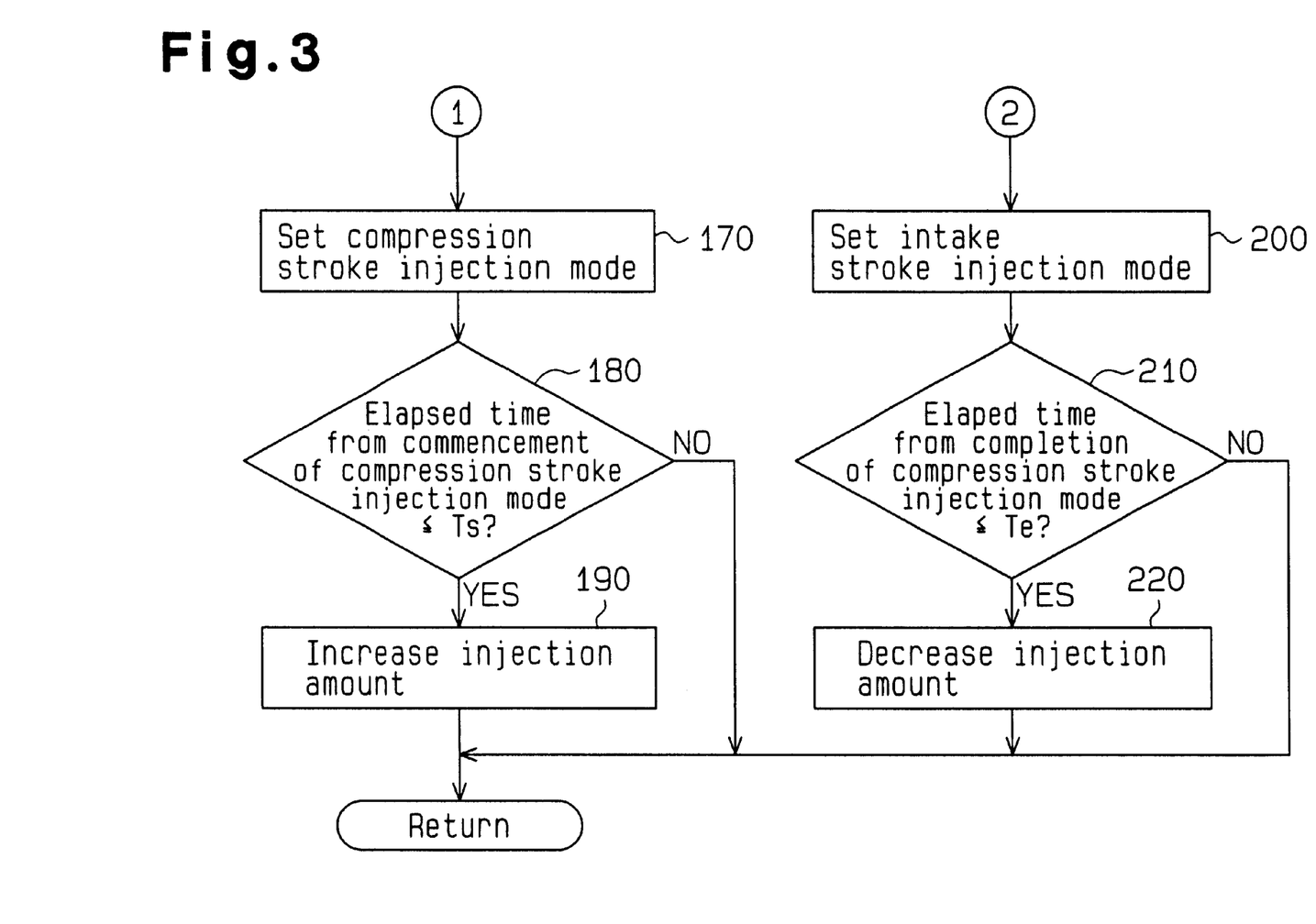
FIG. 3 is a flowchart showing the routine for controlling fuel injection when the engine is cool.

FIGS. 2 and 3 show a flowchart representing the fuel injection control procedure. When the engine 10 is cool, the ECU 40 performs the procedure illustrated by the flowchart in cyclic interrupts at every predetermined crank angle.

When the engine 10 is cool, the fuel injection mode is set in accordance with the engine starting time coolant temperature THWST (engine temperature). Fuel is injected from the fuel injection valves 20 in accordance with the fuel injection mode.

When starting (cranking) the engine 10, the intake stroke injection mode is set and fuel is injected during the intake stroke from the fuel injection valves 20. By injecting fuel during the intake stroke, the time required for vaporizing the fuel injected in the combustion chambers 15 is available. This stabilizes ignition and combustion.

When the engine 10 is started, at step 110, the ECU 40 determines whether or not the starting time coolant temperature THWST is within the second temperature range R2 (15° C. to 40° C.). If the starting time coolant temperature THWST is not in the second temperature range R2, that is, if the starting time coolant temperature THWST is in the first temperature range R1 (lower than 15° C.) or the third temperature range R3 (40° C. or higher), the ECU 40 proceeds to step 200 and sets the injection mode to the intake stroke injection mode. If the starting time coolant temperature THWST is within the second temperature range R2, the ECU 40 proceeds to step 120.

At step 120, the ECU 40 determines whether or not the fuel pressure is greater than or equal to a predetermined pressure P1. The predetermined pressure P1 is the pressure required to inject fuel during the compression stroke. If the fuel pressure is lower than the predetermined pressure P1, the injection of fuel during the compression stroke is prohibited. In this case, the ECU 40 proceeds to step 200. If the fuel pressure is greater than or equal to the predetermined pressure P1, the ECU 40 determines that fuel may be injected during the compression stroke and proceeds to step 130.

At step 130, the ECU 40 determines whether or not the engine speed NE is lower than a predetermined engine speed NE1. In this embodiment, the engine speed NE1 is the maximum engine idling speed. When the engine speed NE is greater than or equal to the predetermined engine speed NE1, the injection of fuel during the compression stroke is prohibited since the time for vaporizing the injected fuel is short. In this case, the ECU 40 proceeds to step 200 and sets the injection mode to the intake stroke injection mode. If the engine speed NE is lower than the predetermined engine speed NE1, the ECU 40 determines that fuel may be injected during the compression stroke and proceeds to step 140.

At step 140, the ECU 40 determines whether or not a large load is being applied to the engine 10 based on, for example, the acceleration pedal position. When a large load is applied to the engine 10, a large amount of fuel is injected. Thus, if the fuel is injected during the compression stroke, the fuel concentration of the air fuel mixture about the spark plugs 22 becomes too high. Accordingly, the ECU 40 proceeds to step 200 and sets the injection mode to the intake stroke injection mode. If a large load is not being applied to the engine 10, the ECU 40 determines that fuel may be injected during the compression stroke and proceeds to step 150.

At step 150, the ECU 40 determines whether or not the temperature of the intake air, which is detected by an intake air temperature sensor (not shown), is higher than or equal to a predetermined temperature TH0. If the intake temperature is lower than the predetermined temperature TH0, the ECU 40 proceeds to step 200 and sets the injection mode to the intake stroke injection mode regardless of the starting time coolant temperature. This is because, if the fuel is injected during the compression stroke when the intake air temperature is lower than the predetermined temperature TH0, the fuel does not have time to fully vaporize, which increases the amount of unburned gases in the emissions. If the intake air temperature is higher than or equal to the predetermined temperature TH0, the ECU 40 determines that fuel may be injected during the compression stroke and proceeds to step 160.

At step 160 determines whether or not the present coolant temperature is lower than the sum of the starting time coolant temperature THWST and $\alpha$. Alpha is greater than zero and set, for example, at 10° C. in this embodiment. If the present coolant temperature is higher than or equal to the sum of the starting time coolant temperature THWST and $\alpha$, the ECU 40 proceeds to step 200 and sets the injection mode to the intake stroke injection mode. As the engine 10 starts to run and the coolant temperature rises by $\alpha$° C. from the starting time coolant temperature THWST, the temperature of the walls of the combustion chambers 15 rises. The amount of fuel deposited on the walls of the combustion chambers 15 is thus substantially null in both intake stroke and compression stroke combustion modes. However, when the fuel is injected during the compression stroke, there is less time for the fuel to vaporize, which increases the amount of unburned gases in the emissions. Thus, the injection mode is set to the intake stroke injection mode when the current coolant temperature is higher than or equal to the sum of the starting time coolant temperature THWST and $\alpha$. If the current coolant temperature is lower than the sum of the starting time coolant temperature THWST and $\alpha$, the ECU 40 proceeds to step 170 and sets the injection mode to the compression stroke mode.

At step 180, the ECU 40 determines whether or not the time that has elapsed from the commencement of the compression stroke injection mode is less than or equal to a predetermined time Ts. If the elapsed time is longer than the predetermined time Ts (if the outcome of step 180 is negative), an amount of fuel corresponding to the engine load and the coolant temperature is injected during the compression stroke. The ECU 40 then temporarily terminates the routine.

Figure 5:
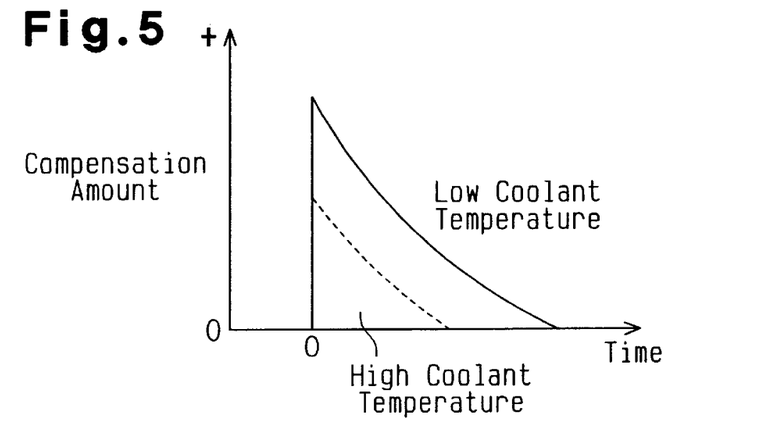
FIG. 5 is a graph showing the compensation amount of the injected fuel amount immediately after switching to the compression stroke injection mode.

If it is determined that the elapsed time is shorter than or equal to the predetermined time Ts in step 180 (if the outcome of step 180 is positive), the ECU 40 proceeds to step 190 and corrects the fuel injection amount that corresponds to the engine load and the coolant temperature by adding a compensation amount to the fuel injection amount. The corrected amount of fuel is injected during the compression stroke. The ECU 40 then temporarily terminates the routine. The compensation amount is set in accordance with the coolant temperature as shown in FIG. 5. The compensation amount increases as the coolant temperature decreases and decreases as the coolant temperature increases. Further, the compensation amount decreases gradually as the elapsed time from the commencement of the compression stroke injection mode increases.

When the engine 10 is cool and the injection mode is changed from the intake stroke injection mode to the compression stroke injection mode, fuel is deposited on the tops of the pistons 14. This momentarily decreases the amount of burnable fuel and causes the resulting stepped torque to produce a shock. Accordingly, the ECU 40 adds the compensation amount to the fuel injection amount to compensate for the decreased burnable fuel amount. This prevents a decrease in the burnable fuel amount and prevents the torque from being stepped. Further, when the injection mode is switched from the intake stroke injection mode to the compression stroke injection mode, the amount of fuel deposited on the tops of the pistons 14 varies in accordance with the engine temperature (coolant temperature). The ECU 40 thus compensates for the fuel deposited in accordance with the engine temperature by adding an appropriate compensation amount to the fuel injection amount. The fuel deposited on the tops of the pistons 14 also decreases as time elapses. The ECU 40 thus compensates for the fuel deposited in accordance with the elapsed time by adding an appropriate compensation amount to the fuel injection amount. At step 190, the ECU 40 functions as a compensating means.

At step 200, the ECU 40 sets the injection mode to the intake stroke injection mode. At step 210, the ECU 40 determines whether the time elapsed from the completion of the compression stroke injection mode is less than or equal to a predetermined time Te. If the elapsed time is greater than the predetermined time Te, a fuel injection amount that corresponds to the engine load and the coolant temperature is injected during the intake stroke. The ECU 40 then temporarily terminates the routine.

Figure 6:
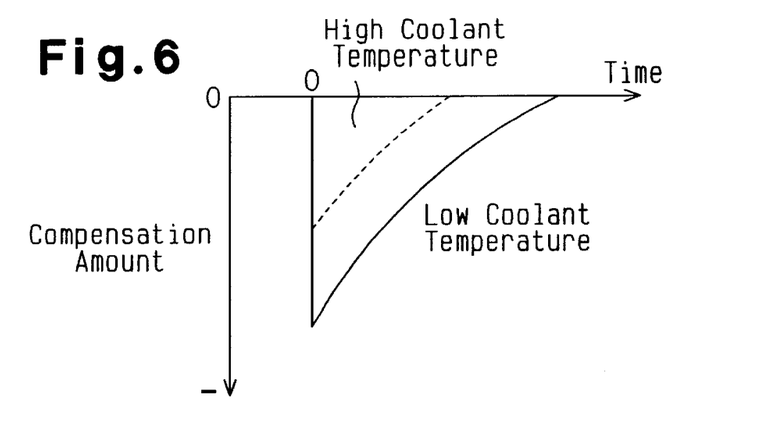
FIG. 6 is a map showing the compensation amount of the injected fuel amount immediately after switching to the intake stroke injection mode.

At step 210, if the elapsed time is less than or equal to the predetermined time Te, the ECU 40 proceeds to step 220 and corrects the fuel injection amount by subtracting a compensation amount from the fuel injection amount that corresponds to the engine load and the coolant temperature. The corrected amount of fuel is injected during the intake stroke. The ECU 40 then temporarily terminates the routine. The compensation amount is set in accordance with the coolant temperature as shown in FIG. 6. The absolute value of the compensation amount increases as the coolant temperature decreases and decreases as the coolant temperature increases. Further, the absolute value of the compensation amount decreases gradually as the elapsed time from the completion of the compression stroke injection mode increases.

When the engine 10 is cool and the injection mode is changed from the compression stroke injection mode to the intake stroke injection mode, some of the fuel deposited on the tops of the pistons 14 is vaporized. This momentarily increases the amount of burnable fuel and causes the resulting stepped torque to produce a shock. Accordingly, the ECU 40 subtracts the compensation amount from the fuel injection amount to compensate for the increased burnable fuel amount. This compensates for the increase in the amount of burnable fuel and prevents the torque from being stepped. Further, when the injection mode is switched from the compression stroke injection mode to the intake stroke injection mode, the amount of fuel deposited on the top of the pistons 14 varies in accordance with the engine temperature (coolant temperature). The ECU 40 thus compensates for the fuel deposited on the pistons 14 in accordance with the engine temperature by subtracting the appropriate compensation amount from the fuel injection amount. The vaporized amount of the fuel deposited on the tops of the pistons 14 also decreases as time elapses when the injection mode is switched from the compression stroke injection mode to the intake stroke injection mode. The ECU 40 thus compensates for the vaporized fuel amount in accordance with the elapsed time by subtracting the appropriate compensation amount from the fuel injection amount. At step 220, the ECU 40 functions as a compensating means.

The present embodiment has the advantages described below.

(a) When the engine starting time coolant temperature THWST is within a predetermined range (second temperature range R2), the ECU 40 sets the injection mode to the compression stroke injection mode. This improves the exhaust gas emissions when the engine 10 is cool.

(b) When the intake air temperature of the engine 10 is lower than a predetermined temperature, the ECU 40 sets the injection mode to the intake stroke injection mode regardless of the engine starting time coolant temperature THWST. This improves the exhaust gas emissions when the engine 10 is cool.

(c) When the coolant temperature of the engine 10 increases, the amount of fuel deposited on the walls of the combustion chambers 15 is substantially null in both intake stroke and compression stroke injection modes. However, since the vaporization time is shorter for the compression stroke injection mode than for the intake stroke injection mode, the amount of unburned gases in the emissions is greater during the compression stroke injection mode. Accordingly, in the present embodiment, the ECU 40 resets the injection mode to the intake stroke injection mode from the compression stroke injection mode when the coolant temperature increases as the engine 10 continues to run. This improves the exhaust gas emissions.

(d) The ECU 40 corrects the fuel injection amount by subtracting the predetermined compensation amount from the fuel injection amount during the intake stroke injection mode. The compensation amount depends on the elapsed time from when the injection mode is changed to the intake stroke injection mode. This prevents an increase in the amount of burned fuel, prevents the torque from being stepped, and improves the performance of the vehicle in which the engine 10 is installed.

(e) The ECU 40 changes the compensation amount in accordance with the coolant temperature of the engine 10. That is, the ECU 40 compensates for the amount of vaporized fuel, which varies in accordance with the coolant temperature (engine temperature), by subtracting an appropriate compensation amount from the fuel injection amount. This improves the vehicle performance.

(f) The ECU 40 gradually decreases the compensation amount in accordance with the elapsed time. That is, the ECU 40 compensates for the amount of vaporized fuel, which varies in accordance with the elapsed time, by subtracting an appropriate compensation amount from the fuel injection amount. This further improves the vehicle performance.

(g) The ECU 40 corrects the fuel injection amount by adding the predetermined compensation amount to the fuel injection amount during the compression stroke injection mode. The compensation amount depends on the elapsed time from when the injection mode is changed to the compression stroke injection mode. This prevents a decrease in the amount of burned fuel, prevents the torque from being stepped, and improves the vehicle performance.

(h) The ECU 40 changes the compensation amount in accordance with the coolant temperature of the engine 10. That is, the ECU 40 compensates for the amount of fuel deposited on the surfaces of the combustion chambers 15, which varies in accordance with the coolant temperature, by adding an appropriate compensation amount to the fuel injection amount. This improves the vehicle performance.

(i) The ECU 40 gradually decreases the compensation amount in accordance with the elapsed time. That is, the ECU 40 compensates for the amount of deposited fuel, which varies in accordance with the elapsed time, by adding an appropriate compensation amount to the fuel injection amount. This further improves the vehicle performance.

It should be apparent to those skilled in the art that the present invention may be embodied in many other specific forms without departing from the spirit or scope of the invention. Particularly, it should be understood that the present invention may be embodied in the following forms.

In the embodiment described above, the ECU 40 resets the injection mode to the intake stroke injection mode from the compression stroke injection mode based on whether or not the coolant temperature has increased from the starting time coolant temperature THWST by $\alpha°$ or more. Alternatively, the ECU 40 may reset the injection mode to the intake stroke injection mode from the compression stroke injection mode when a temperature detected directly from the walls of the combustion chambers 15 becomes higher than or equal to a predetermined temperature.

In the above embodiment, the order for performing steps 110 to 160 may be changed as required.

The present examples and embodiments are to be considered as illustrative and not restrictive, and the invention is not to be limited to the details given herein, but may be modified within the scope and equivalence of the appended claims.

What is claimed is:

1. A fuel injection controller of a cylinder injection engine that selects an injection mode from various fuel injection modes including an intake stroke injection mode, in which fuel is injected during an intake stroke, and a compression stroke injection mode, in which fuel is injected during a compression stroke, the controller comprising:

a selection means for selecting the compression stroke injection mode when the engine is cool if the temperature of the engine when the engine is started is within a predetermined temperature range and for selecting the intake stroke injection mode when the engine is cool if the temperature of the engine when the engine is started is higher than the predetermined temperature range.

2. The fuel injection controller according to claim 1, wherein the selection means selects the intake stroke injection mode regardless of the engine temperature when the temperature of the intake air is lower than a predetermined temperature.

3. The fuel injection controller according to claim 1, wherein, if the compression stroke injection mode is selected, the selection means changes the fuel injection mode to the intake stroke injection mode from the compression stroke injection mode when the engine temperature rises to a certain level.

4. A fuel injection controller of a cylinder injection engine that selects a fuel injection mode from various fuel injection modes in accordance with the operating state of the engine, wherein the modes include an intake stroke injection mode, in which fuel is injected during an intake stroke, and a compression stroke injection mode, in which fuel is injected during a compression stroke, the controller comprising:

a compensating means for performing a compensation, which decreases the amount of fuel injected in the intake stroke injection mode, when the fuel injection mode is changed to the intake stroke injection mode from the compression stroke injection mode when the engine is cool, wherein the compensation is performed for a predetermined time from when the fuel injection mode is changed to the intake stroke injection mode.

5. The fuel injection controller according to claim 4, wherein the compensating means varies the amount fuel injected in accordance with the temperature of the engine.

6. The fuel injection controller according to claim 4, wherein the compensating means gradually decreases the compensation amount in accordance with the elapsed time.

7. A fuel injection controller of a cylinder injection engine that selects a fuel injection mode from various fuel injection modes in accordance with the operating state of the engine, wherein the modes include an intake stroke injection mode, in which fuel is injected during an intake stroke, and a compression stroke injection mode, in which fuel is injected during a compression stroke, the controller comprising:

a compensating means for performing a compensation, which increases the amount of fuel injected in the compression stroke injection mode, when the fuel injection mode is changed to the compression stroke injection mode from the intake stroke injection mode when the engine is cool, wherein the compensation is performed for a predetermined time from when the fuel injection mode is changed to the compression stroke injection mode.

8. The fuel injection controller according to claim 7, wherein the compensating means varies the amount of fuel injected in accordance with the temperature of the engine.

9. The fuel injection controller according to claim 7, wherein the compensating means gradually decreases the compensation amount in accordance with the elapsed time.

10. A fuel injection controller of a cylinder injection engine that selects a fuel injection mode from various fuel injection modes in accordance with the operating state of the engine, wherein the modes include an intake stroke injection mode, in which fuel is injected during an intake stroke, and a compression stroke injection mode, in which fuel is injected during a compression stroke, the controller comprising:

a selection means for selecting the compression stroke injection mode when the engine is cool if the temperature of the engine when the engine is started is within a predetermined te temperature range and for selecting the intake stroke injection mode when the engine is cool if the temperature of the engine when the engine is started is higher than the predetermined temperature range;

a first compensating means for performing a compensation, which decreases the amount of fuel injected in the intake stroke injection mode, when the fuel injection mode is changed to the intake stroke injection mode from the compression stroke injection mode when the engine is cool, wherein the compensation is performed for a predetermined time from when the fuel injection mode is changed to the intake stroke injection mode; and a second compensating means for performing a compensation, which increases the amount of fuel injected in the compression stroke injection mode, when the fuel injection mode is changed to the compression stroke injection mode from the intake stroke injection mode when the engine is cool, wherein the compensation is performed for a predetermined time from when the fuel injection mode is changed to the compression stroke injection mode.

11. A method for controlling fuel injection in a cylinder injection engine that selects an injection mode from various fuel injection modes including an intake stroke injection mode, in which fuel is injected during an intake stroke, and a compression stroke injection mode, in which fuel is injected during a compression stroke, the method comprising:

selecting the compression stroke injection mode when the engine is cool if the temperature of the engine when the engine is started is within a predetermined temperature range; and selecting the intake stroke injection mode when the engine is cool if the temperature of the engine when the engine is started is higher than the predetermined temperature range.

12. The method according to claim 11, further comprising selecting the intake stroke injection mode regardless of the engine temperature when the temperature of intake air is lower than a predetermined temperature.

13. The method according to claim 11, further comprising, if the compression stroke injection mode is selected, changing the fuel injection mode to the intake stroke injection mode from the compression stroke injection mode when the engine temperature rises to a certain level.

14. A method for controlling fuel injection in a cylinder injection engine that selects a fuel injection mode from various fuel injection modes in accordance with the operating state of the engine, if the compression stroke injection mode is selected, wherein the modes include an intake stroke injection mode, in which fuel is injected during an intake stroke, and a compression stroke injection mode, in which fuel is injected during a compression stroke, the method comprising:

changing the fuel injection mode to the intake stroke injection mode; and reducing the amount of fuel injected in the intake stroke injection mode for a predetermined time from when the fuel injection mode is changed to the intake stroke injection mode when the engine is cool.

15. The method according to claim 14, wherein the method includes varying the amount by which the amount of fuel injected is reduced in accordance with the temperature of the engine.

16. The method according to claim 14, wherein the amount by which the fuel injection amount is reduced decreases as the time from when the fuel injection mode is changed to the intake stroke injection mode increases.

17. A method for controlling fuel injection in a cylinder injection engine that selects a fuel injection mode from various fuel injection modes in accordance with the operating state of the engine, wherein the modes include an intake stroke injection mode, in which fuel is injected during an intake stroke, and a compression stroke injection mode, in which fuel is injected during a compression stroke, the method comprising:

changing the fuel injection mode to the compression stroke injection mode; and supplementing the amount of fuel injected in the compression stroke injection mode for a predetermined time from when the fuel injection mode is changed to the compression stroke injection mode when the engine is cool.

18. The method according to claim 17, wherein the method includes varying the amount by which the fuel injection amount is supplemented in accordance with the temperature of the engine.

19. The method according to claim 17, wherein the amount by which the fuel injection amount is supplemented decreases as the time elapsed from when the fuel injection mode is changed to the compression stroke injection mode increases.

20. A method for controlling fuel injection in a cylinder injection engine that selects a fuel injection mode from various fuel injection modes in accordance with the operating state of the engine, wherein the modes include an intake stroke injection mode, in which fuel is injected during an intake stroke, and a compression stroke injection mode, in which fuel is injected during a compression stroke, the method comprising:

setting the fuel injection mode to the compression stroke injection mode when the engine is cool if the temperature of the engine when the engine is started is within a predetermined temperature range;

setting the fuel injection mode to the intake stroke injection mode when the engine is cool if the temperature of the engine when the engine is started is higher than the predetermined temperature range;

decreasing the amount of fuel injected in the intake stroke injection mode when the fuel injection mode is switched to the intake stroke injection mode from the compression stroke injection mode for a predetermined time from when the fuel injection mode is switched to the intake stroke injection mode when the engine is cool; and increasing the amount of fuel injected in the compression stroke injection mode when the fuel injection mode is switched to the compression stroke injection mode from the intake stroke injection mode for a predetermined time from when the fuel injection mode is switched to the compression stroke injection mode when the engine is cool.

* * * * *